March 25, 1952 C. L. CORNELIUS, JR., ET AL 2,590,757
CORK BONDING PROCESS
Filed Jan. 25, 1946 2 SHEETS—SHEET 1
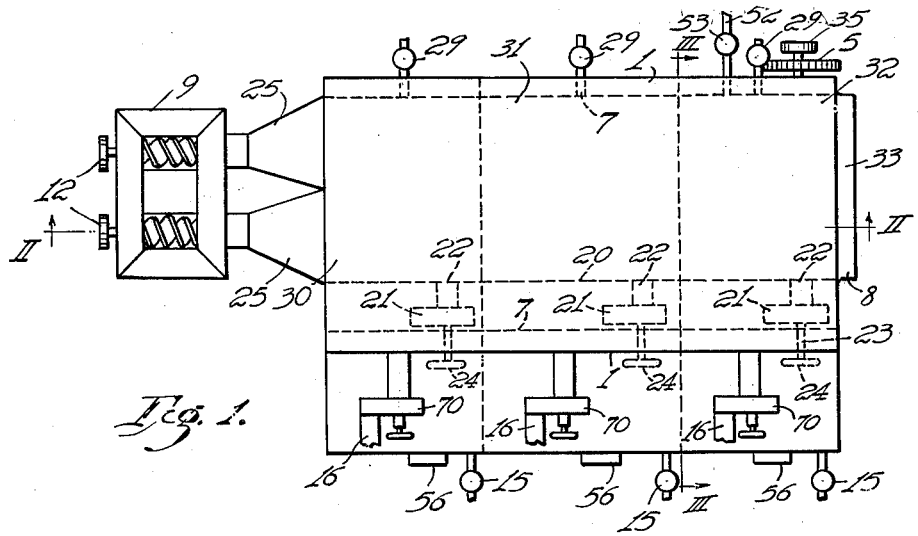
Fig. 1.
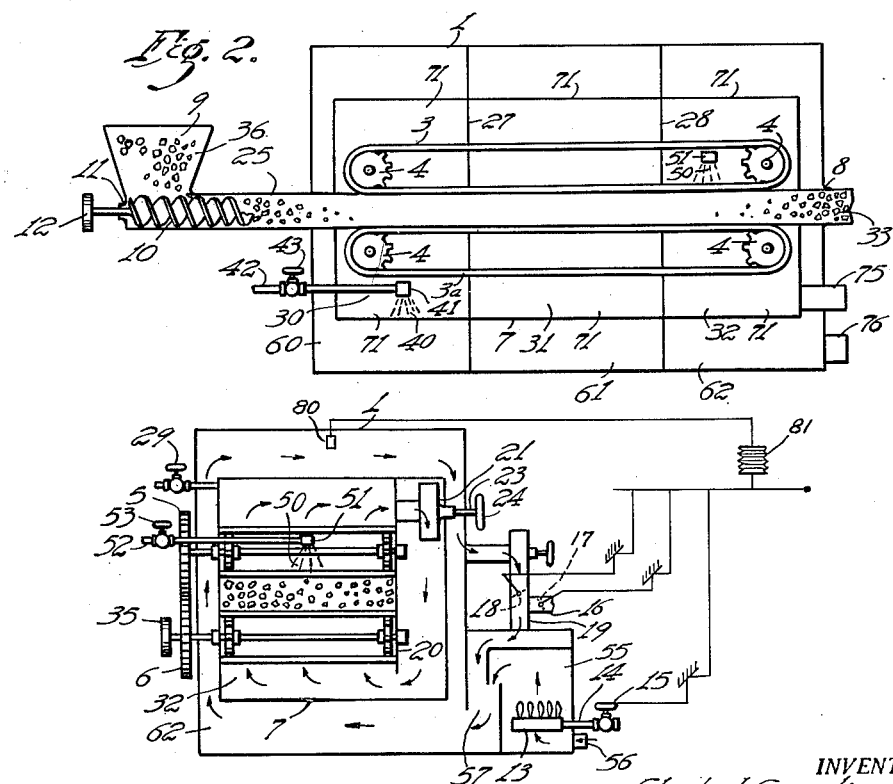
Fig. 2.
Fig. 3.
WITNESS—
E. D. Leiding
INVENTORS.
Charles L. Cornelius Jr. and
Frank H. Cornelius.
BY William R. Coley
ATTORNEY March 25, 1952    C. L. CORNELIUS, JR., ET AL    2,590,757
CORK BONDING PROCESS Filed Jan. 25, 1946      2 SHEETS—SHEET 2

Patented Mar. 25, 1952

2,590,757

UNITED STATES PATENT OFFICE 2,590,757

CORK BONDING PROCESS

Charles L. Cornelius, Jr., and Frank H. Cornelius, Shade Gap, Pa.

Application January 25, 1946, Serial No. 643,440

13 Claims. (Cl. 18—48)

Our invention relates to an improved process for baking granulated cork particles into designed or predetermined shapes such as corkboard and cork pipe covering, also baking other materials such as shredded wood fibers, sawdust and the like into predetermined shapes.

One object of our invention is to provide an improved process for forming particles of cork or other material into board-like or other suitable shapes.

Another object of our invention is to provide an improved process for forming various shredded particles of plant growth or other material into desired dimensional shapes.

A further object of our invention is to treat suitable fibrous particles in an enclosed superheated steam container for the purpose of substantially equally distributing the binder of the material throughout in order to bond said particles together into a uniform dimensional mass.

Another object of our invention is to treat suitable fibrous materials in one or more enclosed steam chambers in which substantially the total amount of the natural binders are retained therein for effecting bonding of the particles into shapes.

A further object of our invention is to remove the air between the particles of fibrous material in a first enclosed chamber, then heat the said material to maximum working temperature in a second chamber without oxidation and then cool the material in a third chamber to complete the shape forming process.

Other objects of our invention will become evident from the following specification and from the drawings, wherein:

Figure 1 is a top plan view of our novel apparatus;

Fig. 2 is a longitudinal sectional view taken along the line II—II of Fig. 1;

Fig. 3 is a cross-sectional view taken along the line III—III of Fig. 1;

Figure 4:
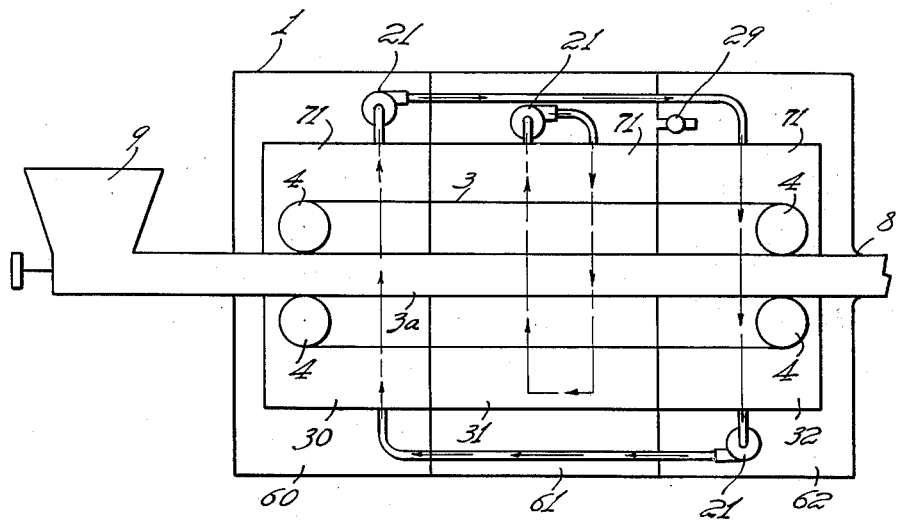
Fig. 4 is a diagrammatic view of a modification of the structure shown in Figs. 1, 2 and 3.

In the prior art, the most common methods of forming corkboard and the like are (1) to place the particles under pressure in a closed mold and bake in an oven, and (2) to pass superheated steam through the compressed material in a mold containing perforated walls for the passage of said steam.

The disadvantage of the former method is that the heat exchange to the material in a mass is very poor due to the low conductivity of the material, thus necessitating a long period of time for the treatment, thereby requiring large ovens and a great number of molds to attain any degree of production.

The latter method overcomes the above disadvantage but has a very low thermal efficiency, since only a portion of the superheat is utilized in heating the material, while most of the sensible heat and all the latent heat are rejected in the steam exhausted from the molds. In addition, this latter process partially distills the binder in the material and said distilled portion is carried along with the steam, resulting in materially affecting the bond of the finished product. In fact, the binder in corkboard produced by this method has little effect in binding the particles together. The principal bond is mechanical in that when heating the cork, the particles creep around each other to fill the air voids because of the expansion of the minute vapor filled cells of the particles effecting mechanical interlocking with adjoining particles.

Most other products made from particles of vegetable growth or fibrous material containing moisture require some sort of filler to effect bonding of the particles. These products use binders such as starch, asphalt and added resins in order to form a desired shape.

In our process, all the above disadvantages are overcome, as heat exchange is greatly improved over the former method of baking cork, since the steam comes into intimate contact with each particle in passing through the material. As compared to the latter method of baking cork, our process shows a remarkably high efficiency as the exhaust is returned to the cycle instead of being rejected. Further, substantially all the binder is retained within the material, giving a maximum bond to the finished product.

With products other than cork our apparatus retains substantially all the natural binder of the material, as well as causing expansion of the fibers to effect a better mechanical bond. Material low in natural binder would require only a minimum added binder to produce an effective bond because of the retention of the natural binder plus the added mechanical interlocking due to expansion caused by heating to a relatively high temperature.

Referring to the drawings, the apparatus shown comprises an outer casing 1; an inner casing 7 (having top, bottom, side and end walls 71) located substantially symmetrically in a vertical plane with respect to outer casing 1, but nonsymmetrically in a horizontal plane with respect thereto, as clearly shown in Figs. 2 and 1, respectively; said inner casing being divided into three zones or ovens 30, 31 and 32, respectively; a hopper 9 feeding into twin screw conveyors 10 for feeding material between an upper and a lower endless conveyor 3 and 3a, located within the inner casing 7; together with certain auxiliary driving or processing apparatus, as hereinafter described in detail.

The loose material 36, such as granulated cork, or other vegetable particles or fibers, is fed into hopper 9 and conveyed and compressed by twin screw conveyors 10 driven by pulleys 12 through shafts 11. The pulleys 12 may be driven by electric motors or any other suitable source of power (not shown). The conversion passages 25 distribute the material evenly from screw conveyors 10 to the space between the endless or belt conveyors 3 which traverse the three ovens or zones 30, 31 and 32 and finally discharge the finished product in a continuous board or other desired or predetermined form or shape through outlet 33, after which it may be cut into any desired lengths. The conveyors as shown deliver the product in a board form, but said conveyors may be readily made in any suitable form to produce other shapes than flats.

The material entering the endless conveyors 3 may be compressed to any desired degree by controlling the relative speeds of pulleys 12 of the screw conveyors and the pulley 35 driving the belt conveyors 3 through gears 5 and 6 and sprockets 4 suitably disposed within the end turns of the conveyors. These pulleys may be driven by motors equipped with, or through, a suitable speed control device, as will be understood. If the displacement of the belt conveyors 3 were one half of that of the screw conveyors 10, then the density of the material entering the conveyors 3 would be twice that of the loose material fed into the hopper 9, assuming no slippage in the conveyors.

To produce the desired superheated steam in each of the ovens or zones 30, 31 and 32, an adjustable heat source, such as a burner 13 (Fig. 3), is associated with each zone with means to recirculate products of combustion as shown by the dotted arrows, as set forth in more detail later. The water to be converted into steam may be furnished by the material to be treated, by adding water to the particles before treatment or by the use of a spray 40 in chamber 30, as described later, or by any desired combination thereof.

Practically all materials processed in our apparatus possess hygroscopic characteristics similar to wood. Assume the material entering the hopper 9 had been stored in a room at 70° F. temperature with a relative humidity of 50% and under this condition the equilibrium moisture content of the material is 15% moisture expressed as a percent of bone dry weight of the material. The function of the first oven or zone 30 is to drive out the entrained air that is contained in the material and replace it with a dry superheated steam; also to partially heat said material entering at a temperature below the working temperature of the said zone. The purpose of evacuating the air from the material in oven 30 which is separated from oven 31 by a partition 27 is to remove the air from the material so as to prevent oxidation of the material when it enters the high temperature oven 31 which will be described later.

The superheated steam in oven 30 is recirculated through the belt conveyors and material being treated by a fan 21 or other suitable positive means, and the flow circuit is identical to that shown by the solid arrows of Fig. 3 which is a section through zone 32. A partition 20 is provided within casing 7 alongside the conveyors 3 and 3a to segregate the suction pressure from the discharge pressure of fans 21, one such fan being provided for each oven 30, 31 and 32. A duct 22 for each fan 21 extends from a suitable opening in partition 20 to the inlet side of each fan. A pulley 24, driven from any suitable source, is mounted on shaft 23 of each fan 21.

Should it be desirable to pass the material through zone 30 without increasing or decreasing the moisture content of the material, then the proper condition of the steam in the said zone to be in equilibrium with the material would occur when the partial vapor pressure of the steam was 50% of its saturated vapor pressure.

As an example, assume the oven 30 is operated at a pressure of 15 pounds per sq. in. absolute and at a temperature of 250° F. By referring to steam tables, saturated steam at 15 pounds absolute has a temperature of 213° F. and at 30 pounds absolute is 250° F. By setting the relief valve 29 of oven 30 (one such valve is provided for each zone) at 15 pounds per sq. in. absolute and maintaining a temperature of the steam at 250° F., then the steam would be superheated from 213° F. to 250° F. and the partial pressure of 15 pounds would be just 50% of its saturated pressure. In other words, the steam would be 50% saturated and in the equilibrium condition required for the material.

The superheated steam passing through the material would displace the air within the voids, but this air would appear in the steam leaving the material, and soon after starting the operation the steam would no longer be a superheated steam but a mixture of steam and air, each having its partial pressure, the sum of which would be 15 pounds per sq. in. absolute, as that is the relief pressure of the valve 29. It is quite evident that to maintain substantially a superheated steam condition within the oven 30 it is necessary to continually add superheated steam to the cycle in order to dilute the air to any desired minimum. By having a suitable source of heat to be described later, it is only necessary to add a water spray 40 to the cycle to obtain the necessary superheated steam makeup.

This water spray 40 is supplied from any suitable source through pipe 42, control valve 43 and spray head 41. Should the temperature of the superheated steam in oven 30 be raised above 250° F., then the partial pressure of the steam would be less than 50% of saturation pressure and cause removal of moisture from the material. Therefore, in most applications of the apparatus, the spray 40 would not be used and the makeup water would come from the material traversing the oven 30 and would be controlled by the temperature of the superheated steam.

An amount of steam slightly less than the makeup would vent to the atmosphere carrying along with it the air removed from the voids in the material, while these voids would be filled with a superheated steam as it enters the higher temperature zone 31, preventing oxidization of the material in zone 31.

If the material was very dry entering oven 30, the temperature required to remove the necessary makeup water from the material may be too high, causing a charring of the surface of the material particles due to the rapid oxidization caused by the air present, so that it would become necessary to lower the temperature and turn on spray 40 to remedy the condition. Actually the gases circulated in oven 30 would not be a pure superheated steam but would contain a very small amount of air and any volatiles that would be driven from the material because of the temperature level of the operation, but for all practical purposes it may be considered superheated steam.

Oven 30 requires a net heat input to the cycle because of the heat required to heat the material and evaporate the moisture removed from either or both the material and spray 40. This heat is furnished by any suitable means such as gas burner 13, Fig. 3, the heat being supplied by gas through control valve 15 and pipe 14, the air for combustion entering through inlet 56. The burner and combustion chamber 55 are located within or adjacent to the heating chamber 60 and are so arranged that the heated gasses within the heating chamber may be recirculated with the addition of new products of combustion from the combustion chamber 55. As shown on the drawing, the burner for each oven is arranged in a similar manner. A passage 57 is provided, in which the recirculated gases and the new products of combustion are mixed together before entering bottom space of the heating chamber 60, which substantially surrounds the periphery of the oven or heating zone 30. The products of combustion in combustion chamber 55 with efficient fuel and air mixture would be very high in temperature and may cause damage to the metal surfaces in its circulatory path. To control the temperature of the gases circulating through the apparatus, the fan 70 recirculates any desired amount of the products of combustion after they have given up their useful heat through the top, bottom, side and end walls or heat exchange surfaces 71, said bottom wall 71 separating zone 30 from the products of combustion in the heating chamber 60 at the bottom of casing 1, and at the same time the fan 70 will effect the venting of a quantity of gas through vent pipe 16 equal to the mass of the new products of combustion coming from the combustion chamber 55, the circulatory path of these gases being shown by the dotted arrows of Fig. 3. The proportion of gases recirculated and vented is controlled by dampers 17 and 18 which are disposed within ducts 16 and 19, respectively. Duct 19 carries the recirculated portion of gases to be mixed with new products of combustion, the exhausted portion being vented through duct 16.

A cleanout door such as 75 may be provided for zone 32, and similar doors (not shown) are preferably provided for the other zones. Likewise, a cleanout door 76 is provided for space 62 of zone 32, and similar doors may be provided for spaces 60 and 61.

Briefly reviewing the cycle in zone 30, the particles of vegetation or other material passing therethrough are treated with a recirculating stream of superheated steam at relatively low temperature, said steam receiving heat from a recirculating stream of products of combustion of controlled temperature. It is of primary concern to control the temperature of the superheated steam; therefore, a thermostat may be located with its thermal element 80 in the path of the steam and utilized to control gas valve 15 and dampers 17 and 18 by means of the expansible element 81 which is responsive to the temperature of the thermal element. This would vary the temperature of the circulating products of combustion varying the head of heat exchange between the products of combustion and the steam to suit the heat load demand. The heat surface 71 forming the wall enclosing the zone 30 is at a temperature above the steam temperature in order to deliver heat to the steam, so that any condensable vapors such as the steam or volatiles from the material could not condense on this warmer surface. This is the reason the heat surface is built in the apparatus instead of being a separately fired superheater external to the apparatus, in which case the walls of the zone may condense vapors as said walls would be exposed to room temperature on the outside.

The high temperature oven or zone 31 is similar in construction to zones 30 and 32 and is separated therefrom by partitions 27 and 28, respectively. The only openings in these partitions are those for the passage of the material and the conveyors. It appears desirable to have all zones operate at the same pressure so that substantially no leakage of steam may occur between zones. The partitions 27 and 28 extend to the outer casing 1 separating the three separate circulating streams of products of combustion to their bottom spaces 60, 61 and 62 in heat exchange relation with their respective zones 30, 31 and 32. While all zones are similar, they may vary considerably as to size and heat load as each zone performs different functions.

The material in traversing oven or zone 31 is raised in temperature by the corresponding burner 13 and the recirculated products of combustion to the maximum desired for processing the product. At this high temperature of, say, 400° to 800° F., depending on the material used, the vapor pressure of the natural binder, such as resins, in the material would be raised, causing a flow of the binder vapors into the stream of superheated steam passing through the material in process. This would also be the case with respect to hygroscopic water contained in the material. In other words, the superheated steam would pick up additional water from the material as well as binder vapors. While the binder may be composed of a complicated chemical series, each of the vapors would produce its respective partial pressure plus the partial pressure of the steam, the summation of which would equal the total pressure of the zone 31. Since the vapor pressure of the binder vapors is very low as compared to that of the water, the circulating stream would be principally that of superheated steam, with a small amount of other vapors from the material. Since water is being removed from the material at this high temperature, the corresponding relief valve 29 would vent a quantity of the combined gases slightly more than the water removed, the additional amount being a very small quantity of the binder.

Should high-temperature zone 31 be operated at 600° F. and 15 pounds per sq. in. absolute, the percentage of saturation could be very low, as the saturation pressure of steam at 600° F. is 1540 pounds per sq. in. absolute or 15÷1540=.01 or 1% of saturation. Under such a highly superheated steam, the material passing therethrough would be dried to very nearly a bone dry condition. At this temperature, the binder would appear partly as a vapor in the steam, partly as a liquid in the material and the heaviest molecules would remain in a waxy or solid state in the material. More specifically, the binder in the material, regardless of its chemical structure, would have a vapor pressure for each respective molecule equal to the vapor pressure of the same molecules of vapor in the steam. Indeed this would be the exact case should the zone 31 be operated at 1540 pounds per sq. in. the saturation pressure of the steam at the 600° F. and all vapors would be in equilibrium with the binder and moisture in the material, the moisture content of the material being the maximum hygroscopic moisture the material would hold and would be the same if the material were stored in a room atmospheric condition of 100% relative humidity. There would be no loss of water nor binder from the material.

By operating the high-temperature zone 31 at 15 pounds absolute, water would be evaporated from the material and would vent through the relief valve carrying a very small portion of binder vapors with it, which represents the only binder that may be removed from the material. It is the substantially in equilibrium vapor pressure of binder vapors within the steam that prevents rapid removal of binder from the material. With the vapor pressure of the binder in the material and the steam in substantial equilibrium and if the material has approached the operating temperature level of the zone 31, the binder would be thoroughly distributed throughout all particles on the surface as well as within each particle. By the expansion of the material particles, they mechanically fit themselves together and by the thorough distribution of the binder, the particles are well joined together, forming a homogeneous structure that when cooled will retain its shape with the desired physical characteristic required for the particular product.

Therefore, the primary purpose of zone 31 is to bond the material together into a designed or predetermined shape. Should the material be low in natural binder, then additional binder may be added in the form of a solid liquid or vapor by mixing with the material before entering hopper 9, by spray within the apparatus or by adding bonding vapor to the circulating steam.

The oven or zone 32 may be referred to as the cooling zone, as its function is to retain the formed material in shape while it is cooled sufficiently to set the binder to permanently hold its shape. This cooling is accomplished by evaporating the water from spray 50, the water being delivered from any suitable source through pipe 52, control valve 53 and spray head 51. The heat for evaporating the water is taken from the material while traversing the zone 32, resulting in cooling the material to approach the working temperature of the zone. If it is desired to raise the moisture content of the material back to the original 15% in order to be in equilibrium with the finished material storage space, then by maintaining the 15 pound per sq. in. pressure and 250° F. temperature in zone 32, the desired condition would be attained and the material would leave zone 32 at approximately 250° F. This would prevent any rapid oxidization of the material with the room air upon discharge of the finished material from the machine.

The material in the desired finished form is discharged through a suitable flexible seal 8 at outlet 33.

The circulating steam in zone 32 would adiabatically evaporate the water from spray 50, causing cooling of the steam which would then heat to its original condition by absorbing heat from the material in passing therethrough.

The heat load from the products of combustion circulating around zone 32 would be extremely small as it is only desired to keep the walls and associated apparatus in contact with the steam circuit slightly above the steam temperature to prevent condensation of any volatiles from the steam on said walls and apparatus.

To simplify discussion, the pressures in the zones were taken at 15 pounds per sq. in. absolute. The fans 21 are utilized in each zone to create a pressure difference across the material in order to produce a flow of steam therethrough. This would create a greater pressure on the lower side of the material which would be of some value greater than 15 pounds as the relief valves 29 are connected to the space above the material in each zone. The pressure drop across the material varies directly with the thickness of the material and inversely with the face area of the material exposed to the steam flow, other conditions being equal. The degree with which the material is compressed upon entering the apparatus, as well as the rate of steam flow will vary the pressure drop required of the fans 21.

It can be seen from these variables that the pressure drop across the fan producing the flow of steam may be very high, probably requiring a multistage centrifugal compressor or other suitable means to create the desired flow. In such a case, the heat produced by adiabatic compression of the steam would partially or wholly carry the heat load of the process, the latter requiring no heat from the fuel. Indeed it appears quite practical, from calculations made, to eliminate the gas burners and products of combustion circuits and process the material by the heat of thermal compression of the superheated steam circuits. However, it is desirable to use a small amount of fuel to keep the walls enclosing the steam circuits at a temperature slightly above the dew point of the vapors to prevent condensation of water and binder on said walls.

The apparatus as shown contains three separate processing zones separated by partitions. In relatively large commercial equipment, the conditions may vary from one end to the other in a designed gradient of conditions requiring no partitions and having the appearance of a single zone.

A further modification or alternate arrangement, for the purpose of effecting additional conservation of heat for the process is to arrange the fans 21 in zones or ovens 30 and 32 so as not to recirculate within their respective zones but instead reconnect them so that the steam leaving zone 30 is delivered by a fan to the entering side of zone 32 and the steam leaving zone 32 is delivered by a fan to the entering side of zone 30, as shown in Fig. 4. The apparatus of Fig. 4 is shown diagrammatically, since it may be similar in every respect to that of Figs. 1, 2 and 3, except in the steam circuits of zones 30 and 32 and the use of a relief vent or valve 29 from zone 31 to cooling zone 32. This action results in approaching a thermodynamic reversible cycle in that the heat removed from the material in cooling zone 32 would be delivered and utilized in heating the material in heating-up zone 30. In addition, the moisture evaporated from the material in zone 30 would be reabsorbed by the dry material in the cooling zone 32, also a portion of the air removed in zone 30 would fill the remaining voids in the material in zone 32. The net heat load of zones 30 and 32 would approach zero, but the material leaving zone 32 would be at a higher temperature than that entering zone 30 by the amount necessary to produce the heat exchange head or temperature difference required to carry out the process.

This required amount of heat is added to the material in zone 31 in which the steam is recirculated within its zone, as shown, and represents the net heat input to the process, neglecting heat losses from the apparatus. The gas burners of zones 30 and 32 would have a very low heat output as their only function would be to keep the walls surrounding their respective zone slightly warmer than the steam so that no condensation of water or other volatiles would occur. The burner of zone 31 would provide substantially the total heat input to the process.

Figure 5:
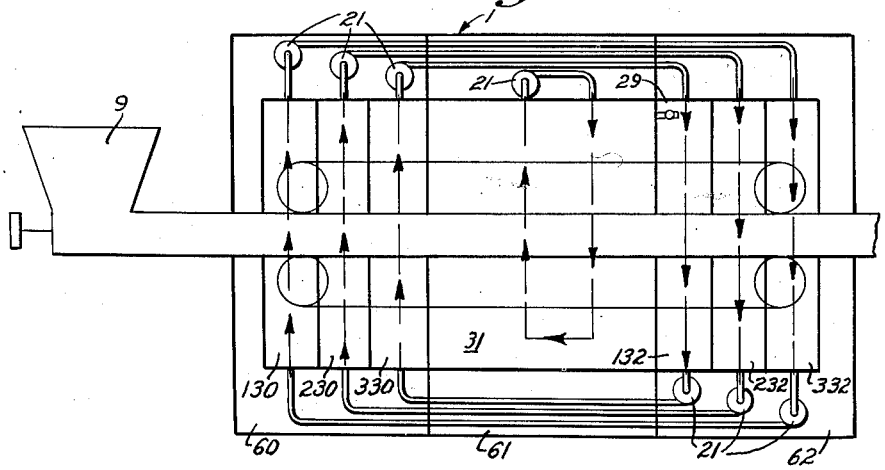
Figure 5 is a diagrammatic view of a modification of the structure shown in Figure 4.

The three zone or oven machine as previously described embodies the minimum number of ovens required to employ the method of recovering heat from the cooling oven to be utilized in heating the material in the heating-up oven 30. If ovens 30 and 32 were each made into a plurality of ovens as shown in Figure 5 and the material heated progressively and cooled progressively and the heat recirculated from the corresponding cooling to heating ovens, the process would approach thermodynamic reversibility. In other words, the net heat input to the central oven 31 would approach zero as the number of heating and cooling ovens approached infinity. The arrangement and operation of the modified machine Figure 5 is similar to the unit in Figure 4 except that the preheating oven is divided into three ovens 130, 230, 330, and the cooling oven is divided into three ovens 132, 232, 332, making it necessary to use three circulating fans on each side of the fibrous material to recirculate the heated gasses from each preheating oven to the corresponding cooling oven and back to the preheating oven.

The moisture in any hygroscopic material entering the apparatus is in the form of a liquid and requires the removal of sensible heat from the superheated steam passing through the material in the heating-up zones to remove moisture from said material. This superheated steam leaving the heating-up zones would give up moisture to the warmer and drier material traversing the cooling zones and the corresponding latent heat of the moisture absorbed would appear as sensible heat in the superheated steam, permitting it to again remove moisture in the heating-up zone as it again traverses the cycle. Similarly, any volatiles such as binder that may be evaporated in the heating up zones would be condensed in the cooling zones. In addition, air that would be removed from the voids in the material entering the apparatus would later fill the voids in the material leaving the apparatus. This being true, then the air concentration within the superheated steam cycles would become progressively less and less in the higher temperature zones.

In a system using the regeneration or recirculation of heat as above described, there would be substantially no loss of moisture nor binder from the material being processed, resulting in little or no use of the water sprays 40 and 50 nor the relief valves 29 of Fig. 1, and the input of heat would be relatively small in a system employing a large number of zones.

In the alternate arrangement the steam passes downward through the material in zone 32 instead of upward as shown in Fig. 1. The steam may pass either way through any zone and to simplify the duct arrangement connecting the fans, the steam is shown passing downward in zone 32 in the alternate method.

Since there are water vapor and binder vapors driven from the material in the high temperature zone 31, it is advisable to have the relief valve 29 discharge into the cooling zone 32 instead of to the atmosphere as shown in Fig. 1, because these vapors will condense on the material in the cooling zone 32 resulting in the binder vapors condensing on the surface of the particles and improving the bond between said particles, in which case all binder and water would be retained in the material discharged from the apparatus.

The conveyors for carrying the material through the zones may be of any suitable design that will hold the mass to a gauge and permit the passage of steam therethrough. The conveyors as shown are parallel, keeping the density of the mass constant. They may be arranged other than parallel if desired to increase or decrease the density of the mass as they traverse the zone or zones.

We do not desire to be restricted to the specific structural details or arrangements of parts herein set forth, as various modifications thereof may be effected without departing from the spirit and scope of our invention. We desire, therefore, that only such limitations shall be imposed as are indicated in the appended claims.

We claim as our invention:

1. The method of bonding fibrous material particles containing moisture and natural resin binder into a predetermined shape, comprising, consolidating said fibrous material particles into a mould to shape and compress the material, enclosing said mould in an oven, heating said oven to generate at atmosphere of superheated steam and vapors of said resin binder, recirculating said atphere through said fibrous material within the oven, and cooling said fibrous material to the setting temperature of the resinous binder while recirculating said atmosphere through the fibrous material.

2. The method of bonding fibrous material particles containing moisture and natural resin binder into a predetermined shape, comprising, consolidating said fibrous material particles, into a mould to shape and compress the material, enclosing said mould in an oven, heating said oven to generate an atmosphere of superheated steam and vapors of said resin binder, recirculating said atmosphere through said fibrous material within the oven, introducing additional resinous binder into said oven to increase the bonding of said fibrous material, and cooling said fibrous material to the setting temperature of the resinous binder.

3. The method of forming a cork composition containing moisture and natural resins in a continuous process, comprising consolidating said composition within forms to shape and compress the composition advancing said forms through a preheating oven wherein the composition is heated to the vaporization point of the natural resins in a recirculating atmosphere of superheated steam, a high temperature oven in which the temperature of the composition is raised to the maximum desired operating temperature in a recirculating atmosphere of superheated steam, and a cooling oven in which the temperature of the composition is lowered to the setting point of the natural resins in a recirculating atmosphere of superheated steam.

4. The method of forming a cork composition containing moisture and natural resins in a continuous process, comprising consolidating said composition within forms to shape and compress the composition advancing said forms through a preheating oven wherein the composition is heated to the vaporization point of a portion of the natural resins in a recirculating atmosphere of superheated steam, a high temperature oven in which the temperature of the composition is raised to the maximum desired operating temperature in a recirculating atmosphere of superheated steam, and a cooling oven in which the temperature of the composition is lowered to the setting point of the natural resins in a recirculating atmosphere of superheated steam, said preheating oven and said cooling oven being interconnected in heat exchange relation whereby the heat removed from the composition in the cooling oven is returned to the preheating oven and the excess steam and vapors of natural resins generated in the preheating oven are transferred to the cooling oven.

5. The method of bonding fibrous material containing moisture and natural resin binder in a predetermined shape, comprising, consolidating said fibrous material into a mould to shape and compress the material, enclosing said mould in an oven, heating said oven to generate an atmosphere of superheated steam and vapors of said resin binder, recirculating said atmosphere through said fibrous material within the oven, and cooling said fibrous material to the setting temperature of the resinous binder while recirculating said atmosphere through the material, and maintaining said atmosphere, while cooling the fibrous material, at a pressure of approximately fifteen pounds per square inch and at a temperature of approximately 250° F.

6. The method of bonding fibrous material containing moisture and natural resin binder in a predetermined shape, comprising, consolidating said fibrous material into a mould to shape and compress the material, enclosing said mould in an oven, heating said oven to generate an atmosphere of superheated steam and vapors of said resin binder, recirculating said atmosphere through said fibrous material within the oven, and cooling said fibrous material to the setting temperature of the resinous binder, while recirculating said atmosphere through the fibrous material, and heating the peripheral walls of said oven to a temperature above the dew point of any of said vapors of the resin binder.

7. The method of treating fibrous material containing moisture and natural resins in a continuous process, comprising consolidating said fibrous material between forms to smooth and compress the composition, advancing said forms through a preheating oven, wherein the composition is heated to the vaporization point of the natural resins in a recirculating atmosphere of superheated steam, a high temperature oven, in which the temperature of the composition is raised to the maximum desired operating temperature in a recirculating atmosphere of superheated steam and vapors of said natural resins, and a cooling oven in which the temperature of the composition is lowered to the setting point of the natural resins while recirculating said atmosphere and controlling the temperature and pressure of said atmosphere of superheated steam and vapors of said natural resins in said cooling oven to thereby control the moisture content of said fibrous material.

8. The method of forming a cork composition containing moisture and natural resins in a continuous process, comprising consolidating said composition within forms to shape and compress the composition advancing said forms through a preheating oven wherein the composition is heated to the vaporization point of the natural resins in a recirculating atmosphere of superheated steam, a high temperature oven in which the temperature of the composition is raised to the maximum desired operating temperature in a recirculating atmosphere of superheated steam and vapors of said natural resins, and a cooling oven in which the temperature of the composition is lowered to the setting point of the natural resins in a recirculating atmosphere of superheated steam and vapors of said natural resins and controlling the temperature and pressure of said atmosphere in said preheating oven, in said high temperature oven, and in said cooling oven to thereby control the moisture content of said cork composition, as it is advanced through the preheating oven, the high temperature oven and the cooling oven.

9. The method of forming a cork composition containing moisture and natural resins in a continuous process, comprising consolidating said composition within forms to shape and compress the composition advancing said forms through a preheating oven wherein the composition is heated to the vaporization point of a portion of the natural resins in a recirculating atmosphere of superheated steam, a high temperature oven in which the temperature of the composition is raised to the maximum desired operating temperature in a recirculating atmosphere of superheated steam and vapors of said natural resins, to thereby vaporize a further portion of the natural resins and to distribute said natural resins throughout the fibers and surfaces of said cork composition, and a cooling oven in which the temperature of the composition is lowered to the setting point of the natural resins in a recirculating atmosphere of superheated steam and vapors of natural resins to condense the vapors of said natural resins of said cork composition.

10. The method of treating fibrous material containing moisture and natural resins in a continuous process, comprising consolidating said fibrous material between forms to smooth and compress the composition, advancing said forms through a plurality of preheating ovens, wherein the composition is heated to the vaporization point of some of said natural resins creating an atmosphere of superheated steam and natural resin vapors, a high temperature oven, in which the temperature of the composition is raised to the maximum desired operating temperature, in a recirculating atmosphere of superheated steam and vapors of said natural resins, having a higher temperature and lower vapor pressure than the fibrous material, thereby effecting a flow of the vapors of moisture and natural resin from the material into the recirculating atmosphere, and a plurality of cooling ovens wherein the temperature of the composition is lowered to the setting point of the natural resins by introducing moisture into the ovens, venting the vapors of moisture and natural resin flowing from the material in the high temperature oven into said cooling ovens, recirculating said atmosphere of superheated steam and natural resin vapors from each of said preheating ovens to the respective cooling ovens, through said fibrous material in the cooling ovens and from each of said cooling ovens to said preheating ovens and through the fibrous material in the preheating ovens, whereby a portion of the moisture and the natural resin vapors, vented from said high temperature oven and recirculated from said preheating ovens, are condensed on said fibrous material in the cooling ovens, and the superheated steam generated by said moisture in contact with the high temperature fibrous material in the cooling ovens is transferred to said preheating ovens to supply heat to the fibrous material in said preheating ovens.

11. The method of treating fibrous material containing moisture and natural resin binder comprising, consolidating said fibrous material into a mould enclosing said mould in an oven, heating said oven to generate an atmosphere of superheated steam and vapors of said resin binder while venting off the air contained in the oven, and recirculating said atmosphere through said fibrous material while reducing the temperature of the material below the setting point of a portion of said vapors of the resin binder.

12. The method of treating fibrous material containing moisture and natural resin binder, which includes consolidating said fibrous material into a mould, enclosing said mould in an oven, heating said oven to generate an atmosphere of steam in the oven, recirculating said steam through said fibrous material within said oven by compression at a low pressure and about 250° F., while venting off the air contained in the oven, continuing said recirculation at a higher pressure to raise the temperature of the oven by the heat of compression to a maximum of 400° to 800° F. to vaporize a portion of the natural resins in said fibrous material, introducing water into the oven to lower the temperature of the fibrous material below the dew point of said vaporized resins, while continuing to recirculate the atmosphere of the oven through the material, to condense a portion of the vaporized resins on the fibrous material and bond the material into a compact mass.

13. The method of treating fibrous material containing moisture and natural resin binder, which includes consolidating said fibrous material into a mould, enclosing said mould in an oven, creating an atmosphere of steam in said oven, recirculating said atmosphere of steam through the fibrous material within the oven by compression at a low pressure and about 250° F., while venting off the air contained in the oven, continuing said recirculation at a higher pressure to raise the temperature of the oven by the heat of compression to a maximum of 400° to 800° F. to vaporize a portion of the natural resins in said fibrous material, introducing water into the oven to lower the temperature of the fibrous material below the dew point of said vaporized resins, while continuing to recirculate the atmosphere of the oven through the material, to condense a portion of the vaporized resins on the fibrous material and bond the material into a compact mass.

CHARLES L. CORNELIUS, Jr.
FRANK H. CORNELIUS.

REFERENCES CITED

The following references are of record in the file of this patent:

UNITED STATES PATENTS

| Number | Name | Date |
|---|---|---|
| 613,828 | Storer et al. | Nov. 8, 1898 |
| 1,607,046 | Bentley | Nov. 16, 1926 |
| 1,671,078 | McManus | May 22, 1928 |
| 1,689,584 | Grupe | Oct. 30, 1928 |
| 1,804,657 | Talbot | May 12, 1931 |
| 1,808,192 | Wadman | June 2, 1931 |
| 1,833,801 | Trent | Nov. 24, 1931 |
| 1,875,365 | Begeman | Sept. 6, 1932 |
| 1,947,408 | Eastman | Feb. 13, 1934 |
| 2,041,377 | Schwarz | May 19, 1936 |
| 2,143,549 | Edmonds | Jan. 10, 1939 |
| 2,167,800 | Flotron | Aug. 1, 1939 |
| 2,296,498 | Brassert | Sept. 22, 1942 |
| 2,335,128 | Merrill | Nov. 23, 1943 |
| 2,339,458 | Champney | Jan. 18, 1944 |
| 2,339,979 | Clarke | Jan. 25, 1944 |
| 2,342,920 | Clark | Feb. 29, 1944 |
| 2,379,195 | Simpson et al. | June 26, 1945 |
| 2,406,297 | Johnston | Aug. 20, 1946 |
| 2,428,555 | Cummins | Oct. 7, 1947 |